H. C. SMITH.
MEAT HOLDING DEVICE.
APPLICATION FILED DEC. 4, 1914.
1,159,285.
Patented Nov. 2, 1915.
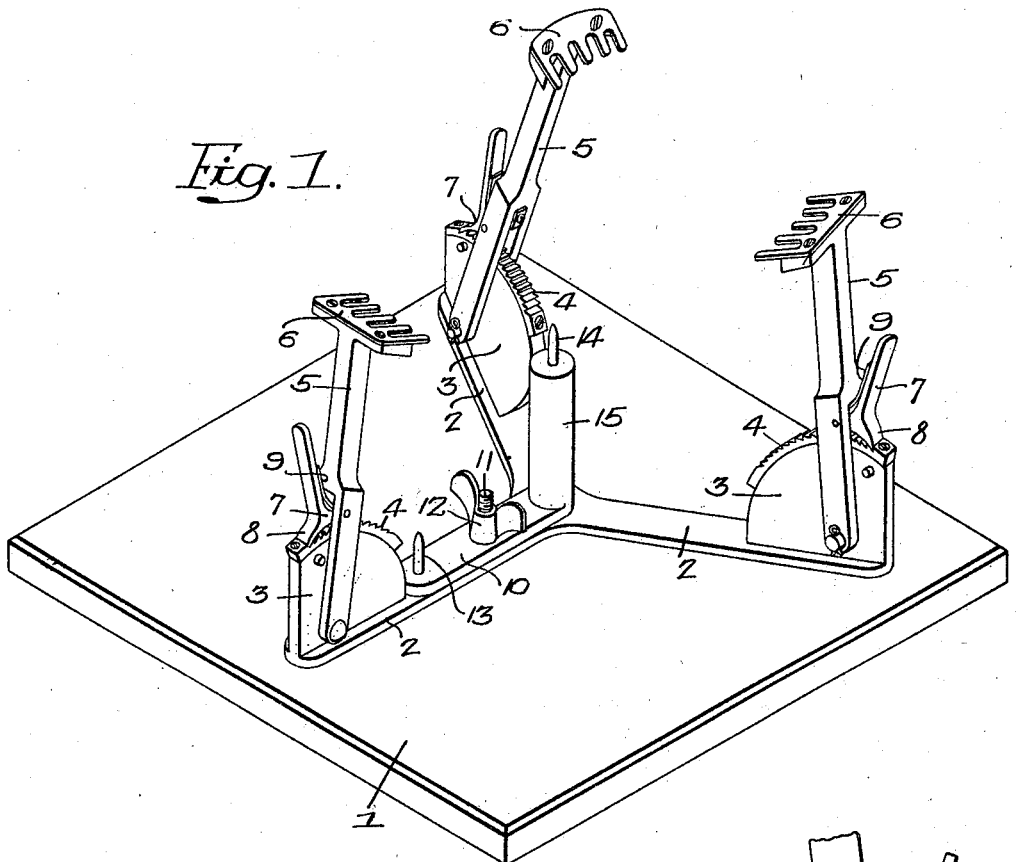
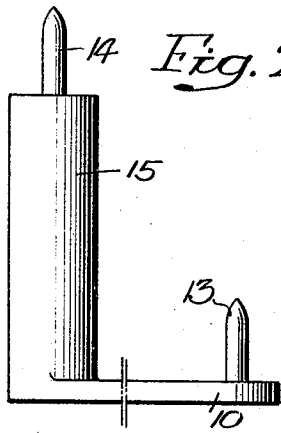
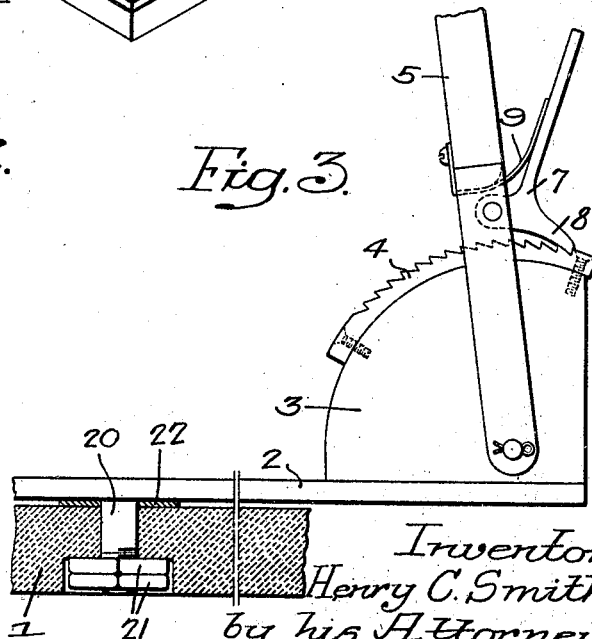
Witnesses—
Inventor—
Henry C. Smith.
by his Attorneys
Howson & Howson

UNITED STATES PATENT OFFICE.

HENRY C. SMITH, OF PHILADELPHIA, PENNSYLVANIA.

MEAT-HOLDING DEVICE.

1,159,285.   Specification of Letters Patent.   Patented Nov. 2, 1915.

Application filed December 4, 1914. Serial No. 875,538.

*To all whom it may concern:*

Be it known that I, HENRY C. SMITH, a citizen of the United States, residing in Philadelphia, Pennsylvania, have invented certain Improvements in Meat-Holding Devices, of which the following is a specification.

One object of this invention is to provide a device for rigidly holding or supporting a body of meat while it is being manually sliced or carved, the arrangement of parts being such as to permit of their convenient adjustment to suit the device for the reception of pieces of meat of widely differing sizes and shapes as well as to permit of the easy release and readjustment of the meat in order that cuts may be taken from any desired part thereof.

Another object of the invention is to provide a meat holding device which, in addition to possessing the above characteristics, shall be inexpensive, simple, durable and easily cleaned.

These objects and other advantageous ends I secure as hereinafter set forth, reference being had to the accompanying drawings in which, Figure 1 is a perspective view of a meat holding device constructed according to my invention, and Figs. 2 and 3 are side elevations illustrating the detail construction of certain parts of the device.

In the above drawings 1 represents a supporting base of suitable material such as marble, slate, or metal, upon which is fixed a casting consisting of three arms 2 radiating from a common center at angles of 120° to each other. At the extremity of each of said arms is fixed a metallic quadrant 3 which extends preferably in a vertical plane including the center line of its arm 2 and has its curved periphery toothed. In the present instance the toothed portion 4 of the quadrant is made detachable from the body 3, although obviously it may be made integral therewith without departing from my invention.

At the center of curvature of each of the quadrants is pivoted or hinged an elongated arm 5 having fixed to its upper end a claw or meat engaging member 6 which preferably consists of a flat metallic plate toothed on its inner edge and detachably connected to the upper end of its arm so as to extend in a plane substantially at right angles to the line thereof. The lower end of each arm is preferably forked so as to extend on opposite sides of its quadrant and immediately above the latter I pivot between the branches of the fork a pawl 7 designed to cooperate with the toothed portion 4 of the quadrant. This pawl preferably has the form of a lever, with one of its arms in the shape of a tooth 8 while its other arm is extended upwardly adjacent the rear edge of the arm 5, with any desired form of flat or coiled spring 9 so mounted as to at all times press the toothed portion of the pawl toward the toothed portion 4 of its quadrant. The arrangement of parts is such that each of the arms may be swung radially inward on its pivot, but is automatically held by its pawl from outward movement. When, however, it is desired to swing an arm outwardly, the upwardly extending arm of its pawl lever is moved inwardly toward its arm 5, thus causing the tooth 8 to disengage the quadrant and permitting the free movement of said arm.

For supporting a body of meat approximately in the center of the base 1 I provide a plate 10 pivoted on a bolt 11 fixed in one of the arms 2 so as to project upwardly therefrom to one side of the center of the device. This plate may be clamped in any given position by means of a butterfly or thumb nut 12 on said bolt and at its ends carries two metallic points 13 and 14 respectively of which the latter projects from the upper end of a cylindrical base piece 15 to a height considerably above the point 13. The center lines of the two points 13 and 14 are equally distant from the center of the bolt 11 and the length of the plate 10 is such that either of them may be brought into a position in which its center line coincides substantially with the center line through the central point of the three armed casting.

If under conditions of use the piece of meat to be sliced or carved is relatively large, the thumb nut 12 is loosened and the small point 13 is moved into the central position, after which said nut is set up in order to clamp the plate 10 in position. The various arms 5 being all moved to their outer positions, the body of meat is placed upon the point 13 which enters it, and said arms are moved toward the meat so that the teeth of the plates 6 enter or grip it thereby holding it rigidly in any desired position regardless of its shape. These arms are held in their adjusted positions by the pawls 7 and as the cutting progresses the meat may be turned by disengaging the toothed plates 6 or the arms and shifting the position of the point 13 in order that it may be at all times held in a position which allows it to be most conveniently worked on.

When the size of the body of meat has been considerably reduced, it may be removed from the point 13 and the plate 10 turned through an angle of 180° to bring the point 14 into operative position in the center line of the device. If the piece of meat be now placed on this second point, it is held by the cylindrical structure in an elevated position and after the toothed plates 6 of the arms 5 have been brought into holding engagement with it, it may be carved as before with the utmost convenience. Obviously the numbers and lengths of the points on the plate 10 are immaterial and while the toothed plates 6 of the arms 5 are each preferably extended laterally in a plane at right angles to the line of the arms on which it is mounted, it will be understood that one or any other suitable number of meat engaging teeth may be used, it being preferable that such teeth should be comparatively blunt in order to avoid accidental injury when the device is not in use.

While the casting constituting the arms 2 may be rigidly fixed to or mounted on the base 1, I find it advisable in some cases to make it rotatable in order to allow of a body of meat held by the arms 5, being turned on a vertical axis in order to present different portions to an operator without requiring him to change his position. With this idea in view said casting, as shown in Fig. 3, would be provided with a central downwardly extending stud 20 threaded at its lower end for the reception of nuts 21, and would have a washer 22 interposed between it and the base in order to limit the area of contact between these parts. With this arrangement the nuts 21 would ordinarily be so adjusted as to permit the revolution of the plate or arm casting on a vertical axis, although if at any time such motion relatively to the base should not be desirable, the nuts would be so set as to rigidly clamp the parts together.

I claim:—

1. The combination in a meat holding device of a supporting base; a plurality of toothed segments mounted thereon in planes radiating from a common center line; meat holding arms forked to extend on opposite sides of the segments and pivoted thereto so as to be movable toward and from said center line; and a pawl on each arm coacting with the adjacent segment.

2. The combination in a meat holding device of a supporting base; a plurality of arms mounted on said base and movable toward and from a common point; means for locking each of the arms in any given position; with a structure having a plurality of meat engaging members of different heights and adjustable to bring any one of said members adjacent the common point toward which said arms are movable.

3. The combination in a meat holding device of a base; a plurality of toothed segments thereon mounted in planes radiating from a common center line; arms respectively pivoted to said segments to operate in said planes; a pawl carried by each arm in position to engage the teeth of the adjacent segment; and a meat engaging point or points on each arm.

4. The combination in a meat holding device of a base; a plurality of arms hinged thereto and each having a transverse toothed member for engagement with the body of meat; a meat engaging point placed in a substantially central position relatively to said arms; and means for holding the arms in any desired positions.

5. The combination in a meat holding device of a supporting structure; a plate pivoted thereto; a plurality of meat holding points projecting upwardly from said plate for different distances; means for clamping said plate with any of its members in a predetermined position relatively to the base; and members movably mounted on the base for rigidly holding a body of meat on that one of the points which occupies the predetermined position.

6. The combination in a meat holding device of a supporting base; a member mounted thereon so as to be capable of rotation about an axis substantially at right angles to the plane of the base; a meat holding point mounted on said member; with a plurality of arms also carried by the member and movable toward and from a body of meat on said point.

7. The combination in a meat holding device of a supporting base; a plate having radiating arms and provided with a projecting stud rotatably securing it to said base; a nut on the stud holding the plate in position; with toothed carrying arms hinged to said plate and movable toward and from each other.

In testimony whereof, I have signed my name to this specification, in the presence of two subscribing witnesses.

HENRY C. SMITH.

Witnesses:
WILLIAM E. BRADLEY,
WM. A. BARR.